United States Patent [19]

Boni

[11] Patent Number: 4,576,044
[45] Date of Patent: Mar. 18, 1986

[54] WHEEL BALANCING APPARATUS

[76] Inventor: Fabio Boni, Via Faentina 96, 50030 Ronta fraz. Borgo S. Lorenzo, Firenze, Italy

[21] Appl. No.: 603,582

[22] Filed: Apr. 25, 1984

[30] Foreign Application Priority Data

May 6, 1983 [IT] Italy ............................... 9418 A/83

[51] Int. Cl.$^4$ ............................................. G01M 1/22
[52] U.S. Cl. ................................. 73/462; 33/143 D; 33/172 E; 33/178 E
[58] Field of Search ............ 33/143 D, 178 E, 203.19, 33/172 E; 73/460, 462

[56] References Cited

U.S. PATENT DOCUMENTS

3,741,016  6/1973  Hofmann ............................. 73/462
4,341,119  7/1982  Jackson ............................... 73/462

*Primary Examiner*—S. Clement Swisher
*Attorney, Agent, or Firm*—McGlew and Tuttle

[57] ABSTRACT

Wheel balancing apparatus includes a shaft for rotating the wheel. Sensing devices are provided on spaced bearings for the shaft to obtain dynamic and positional data concerning the imbalance of the rotating wheel. A feeler arm is mounted so as to be angularly and axially slidably movable about and along an axis parallel to the wheel axis, in such a manner that contact means on the arm are brought successively into contact with opposite edges of the wheel disc. Potentiometers are associated with the arm to sense its axial and angular position when the contact means are in contact with the wheel edges. The radius and thickness of the wheel can then be derived from these positions.

2 Claims, 3 Drawing Figures

4,576,044

WHEEL BALANCING APPARATUS

BACKGROUND OF THE INVENTION

Technical Field

The present invention relates to wheel balancing apparatus for wheels fitted with pneumatic tires.

SUMMARY OF THE INVENTION

The present invention provides apparatus for balancing wheels including a hub disc defining a wheel axis and having inner and outer peripheral edges and a pneumatic tyre mounted between said edges, the apparatus including, a frame, a shaft mounted in said frame for rotating the wheel, and sensing means spaced from one another along said shaft for obtaining dynamic and positional data on any imbalance of the wheel, and computing means, the improvement comprising a feeler arm mounted to said frame so as to be angularly movable about an axis and also movable along said axis, which axis is parallel with said wheel axis, said feeler arm having contact means for contacting said edges of said hub disc, and means for detecting the axial and angular position of said arm to obtain data on the diameter of said hub disc and the axial distance between said edges, said computing means receiving data from said sensing means and said detecting means and deriving therefrom information on the position and the amount of imbalance in the wheel.

The apparatus also provides a device for measuring the radius and thickness of a wheel having a rim, for use in wheel balancing apparatus, the device including a frame, a shaft for mounting the wheel carried on said frame, a rod having an axis and two ends, said rod being slidably mounted to said frame parallel to said shaft and rotatable about its own axis, a feeler arm fixedly mounted to one end of said rod, said arm carrying a contact member for engaging the wheel at its rim on each side of the wheel, a first potentiometer having an angularly movable contact coupled to a fixed point on the rod, the resistance of said first potentiometer representing the angular position of said rod, and a second potentiometer having a contact movable in relation to the axial movement of the rod, the resistance of said second potentiometer representing the axial position of said rod, the radius of the wheel being measured by bringing said contact member into contact with said rim and measuring the resistance of said first potentiometer and deriving the radius therefrom, the thickness being measured by bringing said contact member into contact with said rim successively on each side of the wheel and measuring the resistance of said second potentiometer and deriving the thickness from the difference between the two resistances.

DESCRIPTION OF A PREFERRED EMBODIMENT

A frame 1 supports a shaft 7 by means of bearings 3 and 5. The shaft 7 has a projecting section 7A to support the wheel which is to be balanced. Sensing devices are provided facing the two bearings 3 and 5 and at a distance from one other. The sensing devices are adapted to measure the reactions induced on the bearings by the rotation of the shaft 7 and 7A as a consequence of the imbalances present in the wheel mounted on the shaft.

Figure 1:
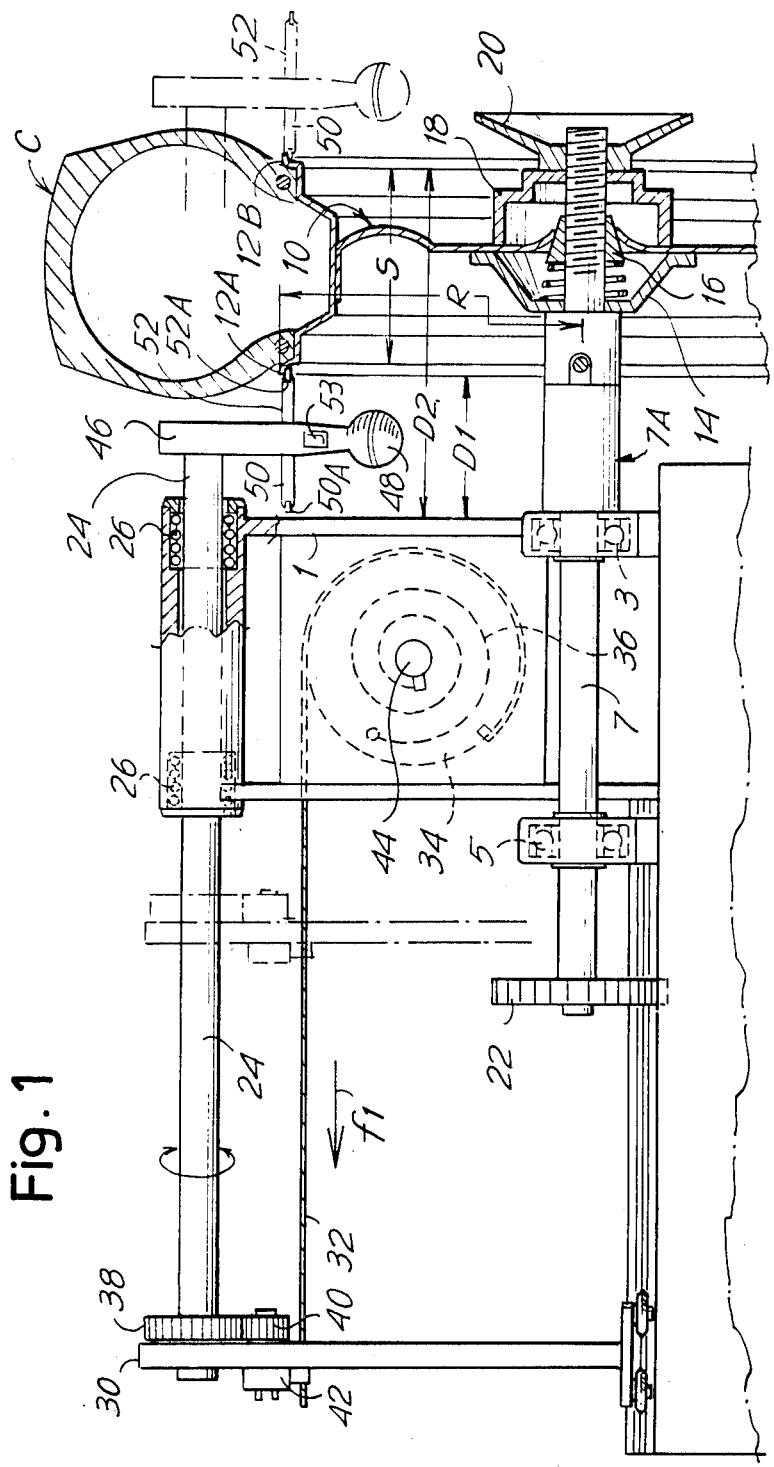
FIG. 1 shows a vertical cross-section through wheel balancing apparatus.
Figure 2:
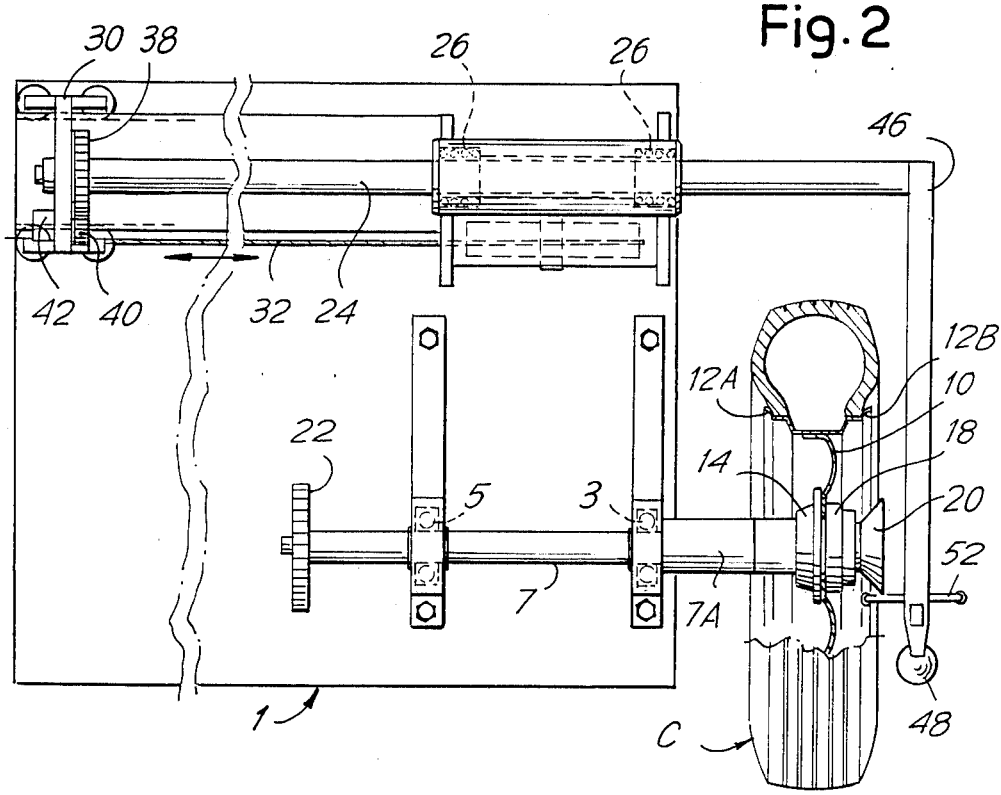
FIG. 2 shows a plan view, partly in cross section, of the apparatus of FIG. 1.
Figure 3:
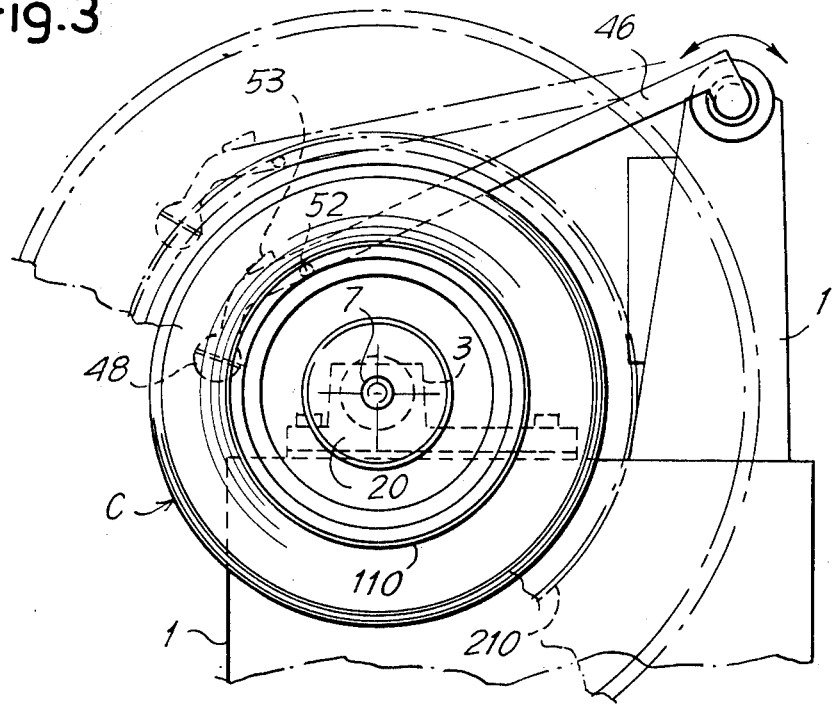
FIG. 3 shows a side view of the apparatus.

The mounted wheel, as shown in FIG. 1 has a hub disc with peripheral edges 12A and 12B to which wheel balancing weights can be applied. The edges 12A and 12B are at the side of the bead heel of the tire C of the wheel. In FIG. 3 reference numeral 110 denotes the disc of a smaller wheel, and 210 the disc of a larger wheel.

The described apparatus is designed to take the necessary measurements to permit the calculation of the position and mass of the weights required for balancing the wheel. In addition the apparatus includes a calculation central station.

In particular, it is necessary to measure the radius R of the edge 12A or 12B, the distance D1 between a reference point such as the center plane of the support or the side of the frame or other fixed part and the edge 12A, the distance D2 between the same reference point and the edge 12B. These two measurements give the distance S which represents the thickness of the hub disc between the two edges ($S = D2 - D1$).

The wheel is mounted with the aid of a support flange 14, a cone 16 which is elastically biased towards the central hole of the disc 10, and a clamping cup 18 moved by a screw flywheel 20 engaged on the threaded end of shaft part 7A.

On the shaft 7 there is also mounted a disc member 22 which acts as an encoder for the estimation of the particular angular positions for the positioning of the balancing weights to be applied on the edges 12A and 12B.

On frame 1 a rotation and running seat is formed for a slidable and rotatable rod 24. The seat may be formed with ball bearings 26 housed within a sleeve containing the rod 24 so that it can move angularly and axially of the sleeve. Rod 24 is offset from and parallel to the shaft axis 7. The offset distance is designed to be greater than the maximum radius of the largest wheel to be mounted to the apparatus for analysis.

Rod 24 is mounted at one end on a slide frame 30 which is able to move along a run parallel with the axis of the rod 24. Onto this movable slide frame 30 there is anchored a traction cable 32 which is wound around a pulley disc or drum 34 mounted so as to turn on the frame 1. Elastic spring means 36 bias the drum 34 so as to tend to wind in the cable 32, while slide frame 30 can be pushed in the direction of the arrow f1 to unwind the cable and to cause the rod 24 to run in the same direction. The rod 24, has a gear ring 38 which is mounted adjacent to the slide of frame 30. The gear ring 38 engages a sprocket wheel 40, which acts as a contact of a potentiometer 42. The gearing between the ring 38 and sprocket 40 is such as to give a high multiplication factor. This arrangement allows the angular position assumed by the rod 24 to be measured.

A futher potentiometer 44 has a contact associated with the drum 34, in such a manner that said potentiometer permits the axial position of the rod 24 to be measured. As the rod runs in the direction of arrow f1 and back, cable 32 imparts angular movement to the angularly movable contact member of the potentiometer 44 which is fixed relative to the drum.

At the end of the rod 24 opposite the gear ring 38, which end is adjacent the overhanging portion 7A of the shaft 7, the rod 24 projects from the frame 1 and carries an arm 46 with operating handle 48. The handle 48 permits the rod 24 to be shifted axially and angularly relative to the axis of the rod 24. The arm 46 has two transversely oppositely extending feelers 50 and 52, which are adapted to establish contact respectively with the edge 12B and with the edge 12A, in dependence on whether the arm 46 is positioned outside or inside the wheel as viewed in FIG. 1.

Arm 46 is fitted with a manually operated push button 53 to enable the central station to acquire the position data registered by the potentiometers at the time the button is pressed. Alternatively the data could be transferred automatically when switches 50A and 52A at the ends of the feelers, make contact with the respective edges.

The arm 46 may be angularly shifted and moved so that the feeler 52 comes into contact with the edge 12A. The push button 53 is then pressed, or the switch 52A is automatically activated by the edge 12A. The setting of the potentiometers 42 and 44 is then sensed by the control station to permit the calculation of the dimension D1 and the radius R. The radius R is measured by means of its substantially bi-univocal relation with the angular position of the arm 46. This manoeuvre of the arm 46 having been completed, and the signals having been acquired from the two potentiometers 42 and 44 to obtain the data on R and D1, the arm is moved so that feeler 52 is moved away from the wheel. The arm 46 is angularly lifted, and pushed together with rod 24 over the tyre C, and then lowered until feeler 50 comes into contact with edge 12B. In this position by means of push button 53 or automatic switch 50A the setting of the potentiometer 44 is sensed to enable the distance to be assessed. The setting of the potentiometer 42 is also sensed to provide a further estimate of the radius R. The value S is derived from the measurements of D2 and D1. The value of R to be used is taken as the average of the two measured values of R. This provides a good approximation of the value of the radial dimension of the edges 12A and 12B and therefore of the diameter of the disc.

Obviously, the above described operations may be reversed, in the sense that it is possible first to detect the edge 12B with the feeler 50, and thereafter to detect the edge 12A with the feeler 52.

A central station (not shown) includes a computer which receives the successive data obtained from the potentiometers 42 and 44 and derives the values of S and R.

On rapid rotation of the wheel and therefore of the shaft 7, the central station calculates from the data obtained by the sensing devices associated with the bearings 3 and 5 and the values of the angular positions from the encoder 32, the values and positions of the weights to be positioned on the edges to balance the wheel.

It will be appreciated that the described apparatus can be used for the inspection of wheels of differing diameters within relatively wide limits (as illustrated by FIG. 3), as the arm 46 is fairly long, both for over-riding wheels of relatively large diameters, and to permit the reading of the values of R along arcs of circumference defined by the feelers 50 and 52 of relatively limited extent, yet sufficient for the estimation of R to the required accuracy.

I claim:

1. In an apparatus for balancing wheels including a hub disc defining a wheel axis and having inner and outer peripheral edges and a pneumatic tire mounted between said edges, the apparatus including, a frame, a shaft mounted in said frame on said wheel axis for rotating the wheel, sensing means spaced from one another along said shaft for obtaining dynamic and positional data on any imbalance of the wheel, and computing means, the improvement comprising a feeler arm mounted to said frame so as to be angularly movable about an arm axis and also movable along said arm axis, said arm axis being parallel to said wheel axis and spaced radial therefrom by at least a distance corresponding to a maximum radius of a wheel with tire to be measured, said feeler arm having contact means for contacting said edges of said hub disc, means for detecting the axial and angular position of said arm, to obtain data on the diameter of said hub disc and the axial distance between said edges, said computing means receiving data from said sensing means and said detecting means and deriving information therefrom on the position and the amount of imbalance in the wheel, a slidable and angularly movable rod mounted in said frame, extending on said arm axis and by means of which said arm is mounted to said frame, said detecting means including two potentiometers associated with said rod for detecting the axial and angular position of said rod and therefore of said feeler arm, and said contact means including two opposite, transversely extending feelers intended to rest respectively and in succession on the two edges of the hub disc of the wheel, substantially at one and the same radial position of the wheel.

2. An Apparatus according to claim 1, further including push button means which on actuation sense the settings of said potentiometers and send this data to said computing means, said push button means being associated with said contact means and being automatically operated when said contact means contacts one of said edges.

* * * * *